(12) United States Patent
Schadow et al.

(10) Patent No.: US 10,799,997 B2
(45) Date of Patent: Oct. 13, 2020

(54) OPTICAL DISPLAY DEVICE UNIT FOR USE IN AN EXTERNAL APPLICATION UNIT

(71) Applicant: Robert Bosch GmbH, Stuttgart (DE)

(72) Inventors: Joachim Schadow, Stuttgart (DE); Florian Esenwein, Leinfelden-Echterdingen (DE); Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 15/534,408

(22) PCT Filed: Dec. 3, 2015

(86) PCT No.: PCT/EP2015/078474
§ 371 (c)(1),
(2) Date: Jun. 8, 2017

(87) PCT Pub. No.: WO2016/096452
PCT Pub. Date: Jun. 23, 2016

(65) Prior Publication Data
US 2017/0348815 A1    Dec. 7, 2017

(30) Foreign Application Priority Data

Dec. 16, 2014 (DE) .................. 10 2014 226 025

(51) Int. Cl.
*B25F 5/02* (2006.01)
*B23Q 17/24* (2006.01)
(Continued)

(52) U.S. Cl.
CPC ......... *B23Q 17/2404* (2013.01); *B23Q 17/24* (2013.01); *B24B 23/028* (2013.01);
(Continued)

(58) Field of Classification Search
CPC ......... B25B 21/00; B25B 21/02; B25B 23/14; B25B 23/1425; B25B 23/0064;
(Continued)

(56) References Cited

U.S. PATENT DOCUMENTS 4,833,782 A * 5/1989 Smith .................. B23D 59/003
30/123
6,516,896 B1 * 2/2003 Bookshar .............. B23P 19/066
173/1
(Continued)

FOREIGN PATENT DOCUMENTS

CN    1520967 A    8/2004
CN    1701924 A    11/2005
(Continued)

OTHER PUBLICATIONS

International Search Report corresponding to PCT Application No. PCT/EP2015/078474, dated Feb. 29, 2016 (German and English language document) (7 pages).

*Primary Examiner* — Scott A Smith
(74) *Attorney, Agent, or Firm* — Maginot, Moore & Beck LLP (57) ABSTRACT

An optical indicating device unit includes at least one first housing, a mechanical interface, and a data interface. The at least one first housing includes at least one illumination device and/or at least one optical device, wherein the at least one illumination device and/or the at least one optical indicating device is configured to visually indicate information. The mechanical interface is configured to connect the at least one first housing to a second housing. The data interface is configured to transmit information to the at least one illumination device and/or the at least one optical indicating device.

8 Claims, 8 Drawing Sheets (51) Int. Cl.
  *B24B 23/02* (2006.01)
  *B24B 23/04* (2006.01)
  *B23B 25/06* (2006.01)
  *B25F 5/00* (2006.01)
  *B25B 21/00* (2006.01)
  *F21Y 115/10* (2016.01)

(52) U.S. Cl.
  CPC ............ *B24B 23/04* (2013.01); *B25F 5/02* (2013.01); *B25F 5/021* (2013.01); *B23B 25/06* (2013.01); *B25B 21/00* (2013.01); *B25F 5/00* (2013.01); *F21Y 2115/10* (2016.08)

(58) Field of Classification Search
  CPC .............. B25B 23/1475; B23D 51/025; B23D 59/002; B23D 59/003; B23D 59/008; B23B 25/06; B23B 49/00; B23B 2260/092; B25F 5/00; B25F 5/021; B23Q 5/00; B23Q 17/24
  USPC ............ 173/2, 176, 217, 20, 21, 171; 227/2, 227/131, 156; 30/371, 392; 362/119, 362/326, 559; 340/660, 680
  See application file for complete search history.

(56) References Cited

U.S. PATENT DOCUMENTS

| | | | |
|---|---|---|---|
| 6,565,227 | B1 | 5/2003 | Davis |
| 6,607,041 | B2 * | 8/2003 | Suzuki ................... B25B 21/02 173/11 |
| 7,346,406 | B2 * | 3/2008 | Brotto ................... B23D 59/008 700/83 |
| 8,033,026 | B2 * | 10/2011 | Gibbons .............. B23D 51/025 30/371 |
| 8,763,721 | B2 * | 7/2014 | Koeder ..................... G06T 7/13 173/171 |
| 2005/0173142 | A1 | 8/2005 | Cutler et al. |
| 2006/0076385 | A1 | 4/2006 | Etter et al. |
| 2008/0196910 | A1 * | 8/2008 | Radle ........................ B25F 5/00 173/2 |
| 2009/0012532 | A1 * | 1/2009 | Quaid ..................... G06F 19/00 606/130 |
| 2011/0067895 | A1 * | 3/2011 | Nobe ..................... B25B 21/00 173/20 |
| 2011/0278037 | A1 * | 11/2011 | Cutler .................... B25B 21/00 173/176 |
| 2012/0267134 | A1 | 10/2012 | Matthias et al. |
| 2013/0133907 | A1 * | 5/2013 | Chen ........................ B25F 5/00 173/20 |
| 2014/0008088 | A1 * | 1/2014 | Chellew ................ B25F 5/021 173/20 |
| 2014/0166324 | A1 | 6/2014 | Puzio et al. |
| 2014/0174773 | A1 * | 6/2014 | Hsieh .................. B25B 23/1425 173/20 |
| 2014/0262391 | A1 * | 9/2014 | Eardley ................ H02J 7/0044 173/20 |
| 2015/0209950 | A1 * | 7/2015 | Lutz ..................... B24B 23/028 173/20 |
| 2015/0316913 | A1 * | 11/2015 | Rickey ................... G05B 15/02 700/180 |

FOREIGN PATENT DOCUMENTS

| | | |
|---|---|---|
| CN | 103586741 A | 2/2014 |
| CN | 103826796 A | 5/2014 |
| DE | 20 2006 004 936 U1 | 9/2007 |
| DE | 601 33 141 T2 | 2/2009 |
| DE | 10 2007 061 374 A1 | 6/2009 |
| DE | 10 2009 002 774 A1 | 11/2010 |
| DE | 10 2009 045 946 A1 | 4/2011 |
| DE | 10 2012 105 483 A1 | 12/2013 |
| EP | 1 281 486 A1 | 2/2003 |
| EP | 1 349 281 A2 | 10/2003 |
| EP | 2 072 192 A1 | 6/2009 |
| JP | 2001-300867 A | 10/2001 |
| WO | 2014/008627 A1 | 1/2014 |
| WO | 2014/179895 A2 | 11/2014 |

* cited by examiner

OPTICAL DISPLAY DEVICE UNIT FOR USE IN AN EXTERNAL APPLICATION UNIT

This application is a 35 U.S.C. § 371 National Stage Application of PCT/EP2015/078474, filed on Dec. 3, 2015, which claims the benefit of priority to Serial No. DE 10 2014 226 025.6, filed on Dec. 16, 2014 in Germany, the disclosures of which are incorporated herein by reference in their entirety.

The disclosure relates to an optical indicating device unit for use in an external application unit.

SUMMARY

An optical indicating device unit according to the disclosure has the advantage that it can be connected to a variety of external application units such as, for example, a hand-held power tool. Advantageously, at least one first housing has an illumination device and/or an optical indicating device. Thus, advantageously, information can be indicated optically, for example to a user of the external application unit.

An illumination device is to be understood to mean, in particular, a device that visually indicates information by the emission of visible light.

Visible light is to be understood here to mean, in particular, light that, in particular, has the following indications:
- a change in the light color
- a change in the light intensity
- light pulses of differing length
- light pulses of differing brightness
- running light, which change in the running direction of the light
- light pulses, varying in pulse frequency and/or brightness An optical indicating device is to be understood here to mean, in particular, a device that visually indicates information by means of a digital indication, a display, or the like.

It is proposed that the optical indicating device unit have at least one mechanical interface, for connecting the first housing to at least one second housing. Thus, particularly advantageously, the optical indicating device unit can be connected to any external application unit.

A mechanical interface is to be understood here to mean, in particular, the contact surface of the optical indicating device unit that can come into contact with an external contact surface.

It is additionally proposed that the optical indicating device unit have at least one data interface, which is designed to transmit, in particular, information of an external electronic unit to the optical indicating device. The data interface in this case may be a UART interface or the like, an interface considered appropriate by persons skilled in the art, or realized by means of SPI, I²C or the like.

Advantageous developments of the battery-operated hand-held power tool are rendered possible by additional features disclosed herein.

Advantageously, the second housing is disposed, at least, on a hand-held power tool. Thus, advantageously, the optical indicating device unit can be connected to an external application unit, in particular a hand-held power tool. This renders possible a modular structure of an external application unit such as, for example, a hand-held power tool. The term "modular structure" is to be understood here to mean a structure, in particular, according to a modular design principle. This means that the optical indicating device unit can be assembled with a multiplicity of differing external application units. This modular structure renders possible simple and inexpensive assembly.

Advantageously, at least one external electronic unit is disposed in the second housing. The electronic unit is designed, advantageously, to evaluate data, and/or to communicate with other electronic units.

Advantageously, the optical indicating device unit can be connected, in particular separably, to a variety of external application units.

Advantageously, the illumination device has at least one light source and/or at least one light conductor. Thus, particularly advantageously, light can be transported from a light source by means of light conductors, and an environment close to a tool, such as, for example, a work area, can be illuminated. It is also conceivable, however, for optical information to be projected onto the environment close to a tool, or onto the workpiece. A light source is to be understood here to mean, in particular, a device that emits visible light.

In an advantageous embodiment according to the disclosure, the light conductor is realized as a light bar. Thus, advantageously, the environment close to a tool can be illuminated at an angle a by light. The angle is advantageously greater than 0° and less than 270°.

Advantageously, the light source has at least one LED. In an advantageous embodiment, the light source has a multiplicity of LEDs. The LEDs may be provided in a variety of designs and sizes. The LEDs may be disposed in various configurations on the first housing.

Advantageously, the optical indicating device unit may be designed to provide an indication relating to the parameters of the external application unit.

In the embodiment according to the disclosure, the optical indicating device unit has at least one second electronic unit, which is designed to integrate further functions.

Advantageously, the external application unit is at least one hand-held power tool. The hand-held power tool comprises at least one external electronic unit, which is designed to provide an optical parameter, which is designed to be transmitted via the data interface.

In an advantageous embodiment, the hand-held power tool is realized as a random-orbit sander.

In another advantageous embodiment, the hand-held power tool is realized as an angle grinder.

In another advantageous embodiment, the hand-held power tool is realized as an orbital or delta sander.

In another advantageous embodiment, the hand-held power tool is realized as an oscillating multitool.

In another advantageous embodiment, the hand-held power tool is realized as a router.

It is also conceivable, however, for the hand-held power tool to be realized as a straight grinder, as an oscillating multitool, as a jigsaw, as a circular saw, as a riveter, as a hammer drill or percussion hammer, as a drill, as a screwdriver or as an impact wrench, or the like.

Further advantages and expedient embodiments are given by the description of the figures and the drawings.

BRIEF DESCRIPTION OF THE DRAWINGS

The drawings show exemplary embodiments of an optical indicating device unit according to the disclosure, and the external application units according to the disclosure, each having an optical indicating device unit.

There are shown in.

DETAILED DESCRIPTION

Components that are the same in the differing exemplary embodiments are denoted by the same references.

Figure 1:
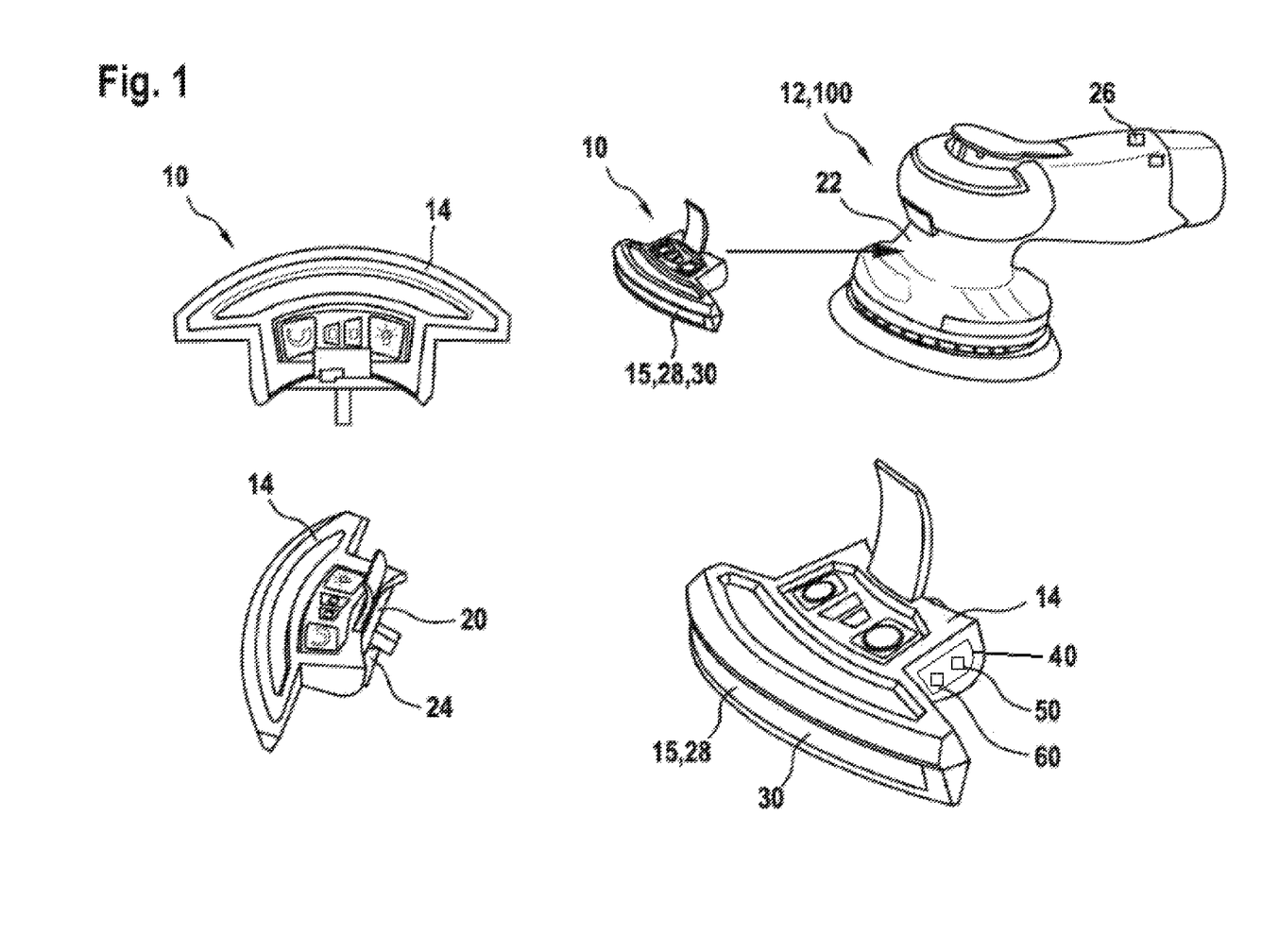
FIG. 1 a first embodiment of an optical indicating device unit according to the disclosure, in three perspectives, with an external application unit according to the disclosure, in a schematic representation, FIG. 2 a second embodiment of the optical indicating device unit according to the disclosure, in a schematic representation, FIG. 3 a first external application unit according to the disclosure, with an optical indicating device unit, in a schematic representation, FIG. 4 a second external application unit according to the disclosure, with an optical indicating device unit, in a schematic representation, FIG. 4a the second external application unit according to the disclosure, with an optical indicating device unit, in a schematic representation, FIG. 5 a third external application unit according to the disclosure, with an optical indicating device unit, in a schematic representation, FIG. 6 a fourth external application unit according to the disclosure, with an optical indicating device unit, in a schematic representation, FIG. 7 a fifth external application unit according to the disclosure, with an optical indicating device unit, in a schematic representation.

FIG. 1 shows an optical indicating device unit 10 in three perspectives. The optical indicating device unit 10 is designed, in particular, to be connected to an external application unit 12. The optical indicating device unit 10 has a first housing 14. In the exemplary embodiment in FIG. 1, there is an illumination device 15 disposed on the first housing 14. The illumination device 15 is designed to visually indicate information by emission of visible light. In particular, an environment, in particular a work region, is illuminated.

Figure 2:
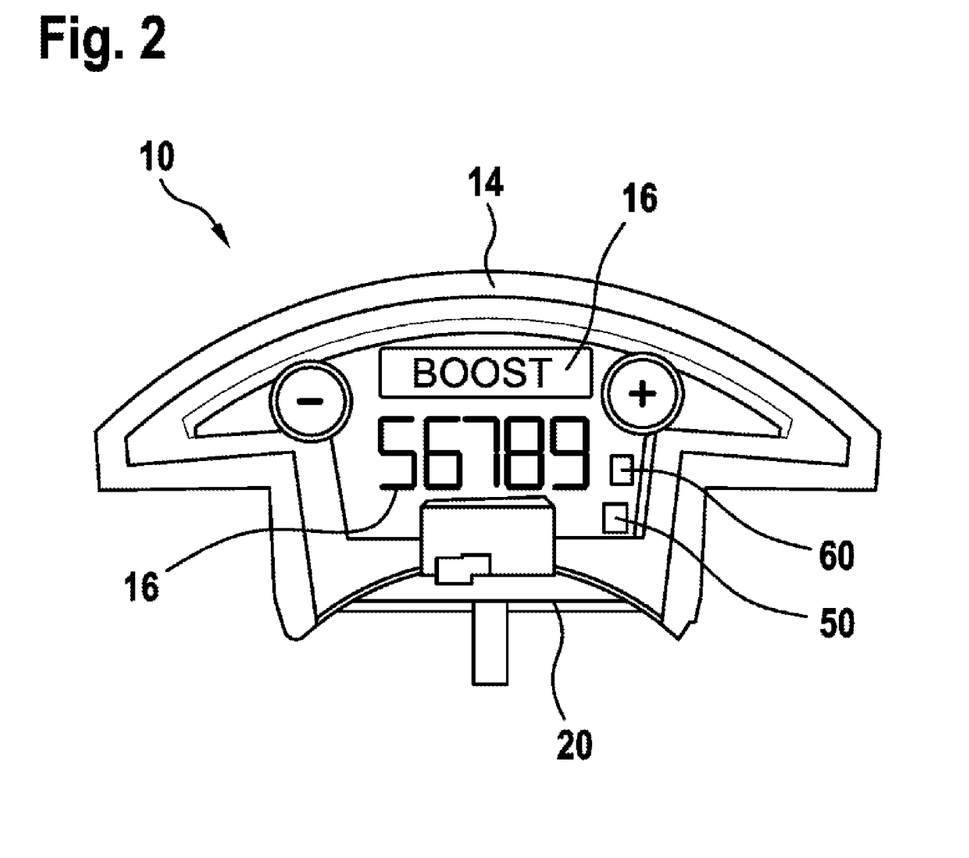

The illumination device 15 may realize the following indications:

Light, in particular having the following indications
  a change in the light color
  a change in the light intensity
  light pulses of differing length
  light pulses of differing brightness
  running light, with change in the running direction of the light
  light pulses, varying in pulse frequency and/or brightness In the exemplary embodiment in FIG. 2, there is an optical indicating device 16 disposed on the first housing 14. The optical indicating device 16 is designed to visually indicate information by means of a digital indication, a display or the like. A display visualizes information such as images or characters. The display of the optical indicating device 16 shows information relating to parameters, such as a rotational speed, a temperature, a mode indication, or the like.

Furthermore, it is conceivable for the illumination device 15 and/or the optical indicating device 16 to be realized as a projection device, which project information into an environment, in particular into a work environment.

In the embodiment according to the disclosure, the optical indicating device 10 has a mechanical interface 20 for connecting the first housing 14 to a second housing 22. The mechanical interface 18 produces a mechanically solid, but separable, connection of the two housings 14, 22.

The optical indicating device unit 10 comprises a data interface 24. The data interface 24 transmits information, provided by an external electronic unit 26, to the illumination device 15 and/or to the optical indicating device 16. This information is visualized in the form of visible light or a digital indication.

The second housing 22 is disposed on the external application unit 12. In the exemplary embodiment (FIG. 1, FIG. 3), the external application unit 12 is a hand-held power tool 100. The optical indicating device unit 10 can thus be attached to hand-held power tools 100 of various types. The advantage consists in that the optical indicating device unit 10 can be attached to any of a variety of external application units 12, 100, 100a, 100b1, 100b2, 100c, 100d, 100e, and can thus be used in a flexible manner.

Via the mechanical interface 20, the first housing 14 is solid with the second housing 22, but is connected so as to be manually separable, without the use of a tool or by means of a suitable tool. The optical indicating device unit 10 can thus be connected, in particular separably connected, to a variety of external application units. This renders possible a modular structure of a power tool. The term "modular structure" is to be understood here to mean a structure, in particular, according to a modular design principle. This means that the optical indicating device unit 10 can be assembled with a multiplicity of differing external application units. This modular structure renders possible simple and inexpensive assembly.

The second housing 22 accommodates the external electronic unit 26. The external electronic unit 26 consists of at least the following components:
  electronics components that supply current to an electric-motor drive
  at least one open-loop and/or closed-loop control unit
  electronic components that generate the optical data As can be seen in FIG. 1, the illumination device 15 comprises a light conductor 30. The light conductor 30 is a transparent element that transports data, or optical information, in the form of light. In FIG. 1, the light conductor 30 is realized as a light bar.

A multiplicity of LEDs serve as a light source. The LEDs may be mounted on a circuit-board conductor by through-hole mounting. However, the LEDs may also be realized as SMD LEDs. The light emitted by the light source may have differing colors. The light emitted by the light source may vary in brightness. The light emitted by the light source may be a flashing light that periodically changes in brightness.

The optical indicating device unit 10 has a second electronic unit 40. The second electronic unit is designed to integrate further functions. Thus, the second electronic unit 40 may comprise a sensor means, a communication means, a data processing means, a storage means, an energy means, an identification means, or the like.

Thus, at least the following functions may be integrated:
  measurement of characteristic quantities
  conversion of the characteristic quantities into sensor signals
  indication of characteristic quantities and/or parameters
  sending, receiving, exchanging and/or storing visual information and/or electronic data
  open-loop and/or closed-loop control of parameters The optical indicating device unit 10 has a communication module 50. The communication module is preferably realized as a wireless communication module. The communication module in this case may be realized as a WLAN communication module, as a Bluetooth communication module, as a radio communication module, as an RFID communication module, as an NFC communication module, as an infrared communication module, as a mobile telephony communication module, or the like. Advantageously, the communication module is designed for bidirectional data transmission. In an alternative design, the communication module is realized as a wired communication module, such as, for example, as a LAN communication module, as a USB communication module, or the like.

The optical indicating device unit 10 has a sensor module 60. The sensor module 60 is equipped with one or more sensors. The sensors are designed to sense a characteristic quantity that is to be determined, and convert it into a sensor signal, or a plurality of sensor signals.

Figure 3:
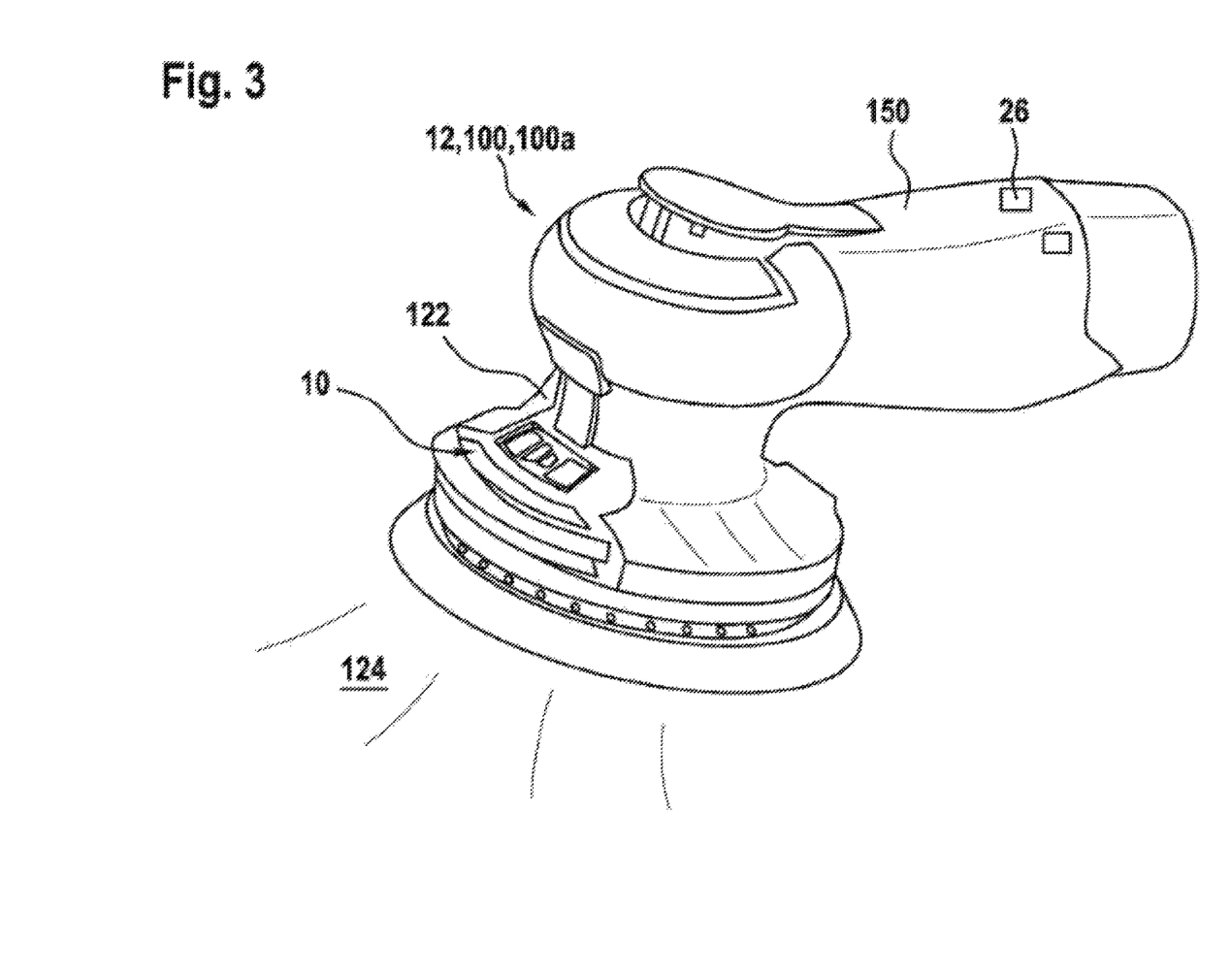

FIG. 3 shows an external application unit 12 realized as a hand-held power tool 100. In the exemplary embodiment, the hand-held power tool 100 is realized as a random-orbit sander 100a. The second housing 22 comprises a motor housing part 122. Adjoining the motor housing part 122 there is a handle region 150. The handle region 150 is realized as a handle, or serves an operator of the random-orbit sander as a handle. The term "handle" is to be understood to mean a structural part around which at least one hand of the operator can be placed in order to guide the hand-held power tool 100. Disposed in the second housing 22 there is an electric-motor drive, not represented in greater detail.

An optical indicating device unit 10 is disposed on the motor housing part 122. The motor housing part 122 in this case has its maximum diameter. The illumination device 15 is disposed along the housing circumference, at the maximum diameter. The illumination device 15 is designed to illuminate a work environment 124. To illuminate in this case is to be understood to mean to "light up" or to "light up in combination with a transmission of information". The optical illumination device 15 may be connected to the motor housing part 122 by adhesive bonding, latching, clamping, clipping, or the like.

The hand-held power tool 100 comprises an external electronic unit 26, which is designed, at least, to provide an optical parameter. The optical parameter is transmitted via the data interface 24 of the optical indicating device unit 10.

Furthermore, the optical indicating device unit 10 may comprise a sensor means, a communication means, a data processing means, a storage means, an energy means, an identification means, or the like.

Thus, at least the following functions may be integrated:
measurement of characteristic quantities
conversion of the characteristic quantities into sensor signals
indication of characteristic quantities and/or parameters
sending, receiving, exchanging and/or storing visual information and/or electronic data
open-loop and/or closed-loop control of parameters In the exemplary embodiment in FIG. 3, the hand-held power tool 100 is realized as a random-orbit sander 100a.

Figure 4:
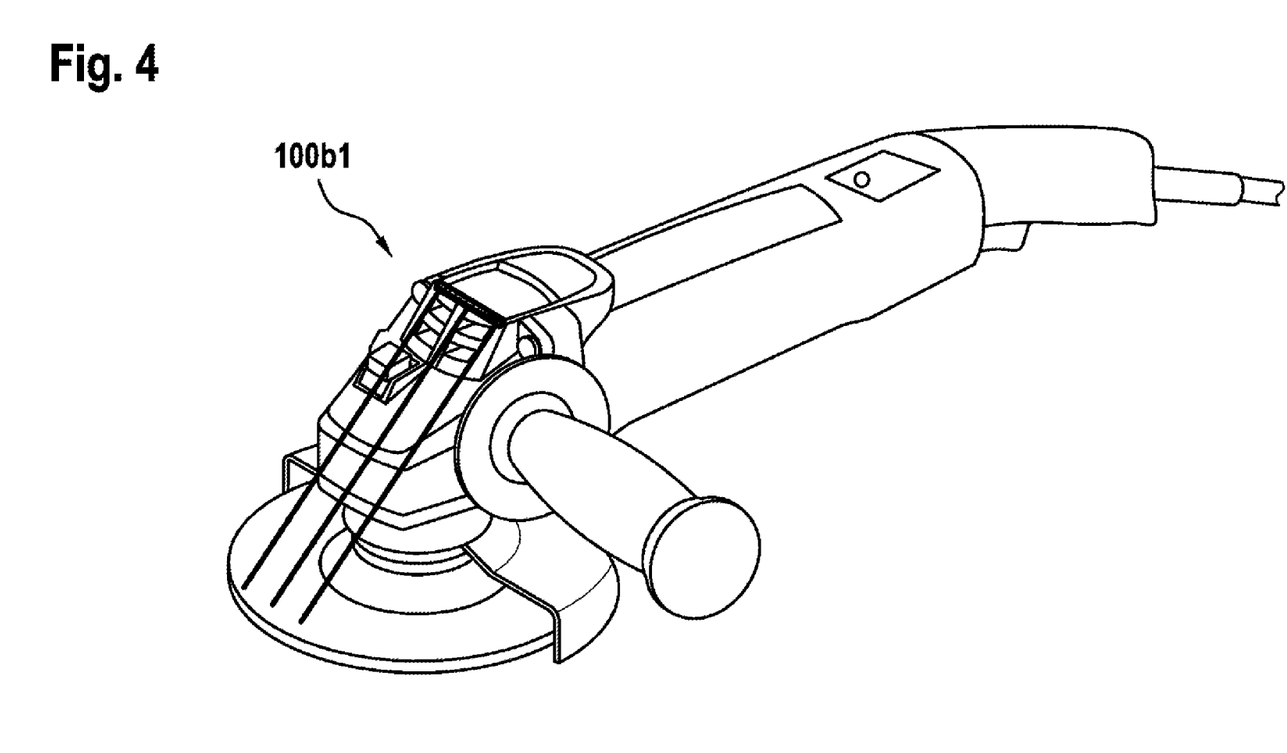

In the exemplary embodiment in FIG. 4, the hand-held power tool 100 is realized as an angle grinder 100b1. The angle grinder 100b in this case is realized as a mains-operated appliance.

Figure 4A:
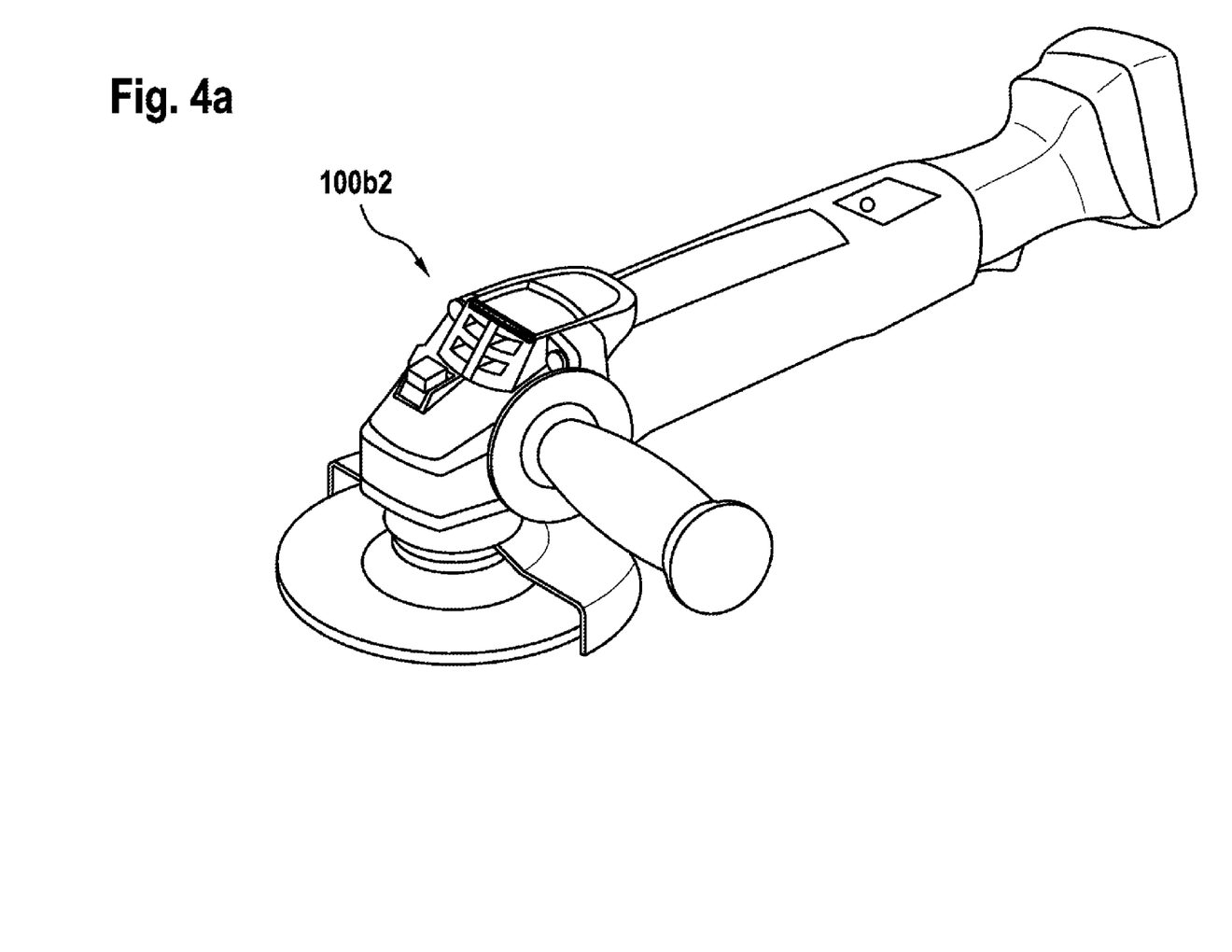

In the exemplary embodiment in FIG. 4a, the hand-held power tool 100 is realized as an angle grinder 100b. The angle grinder 100b2 in this case is realized as a battery-operated hand-held power tool.

Figure 5:
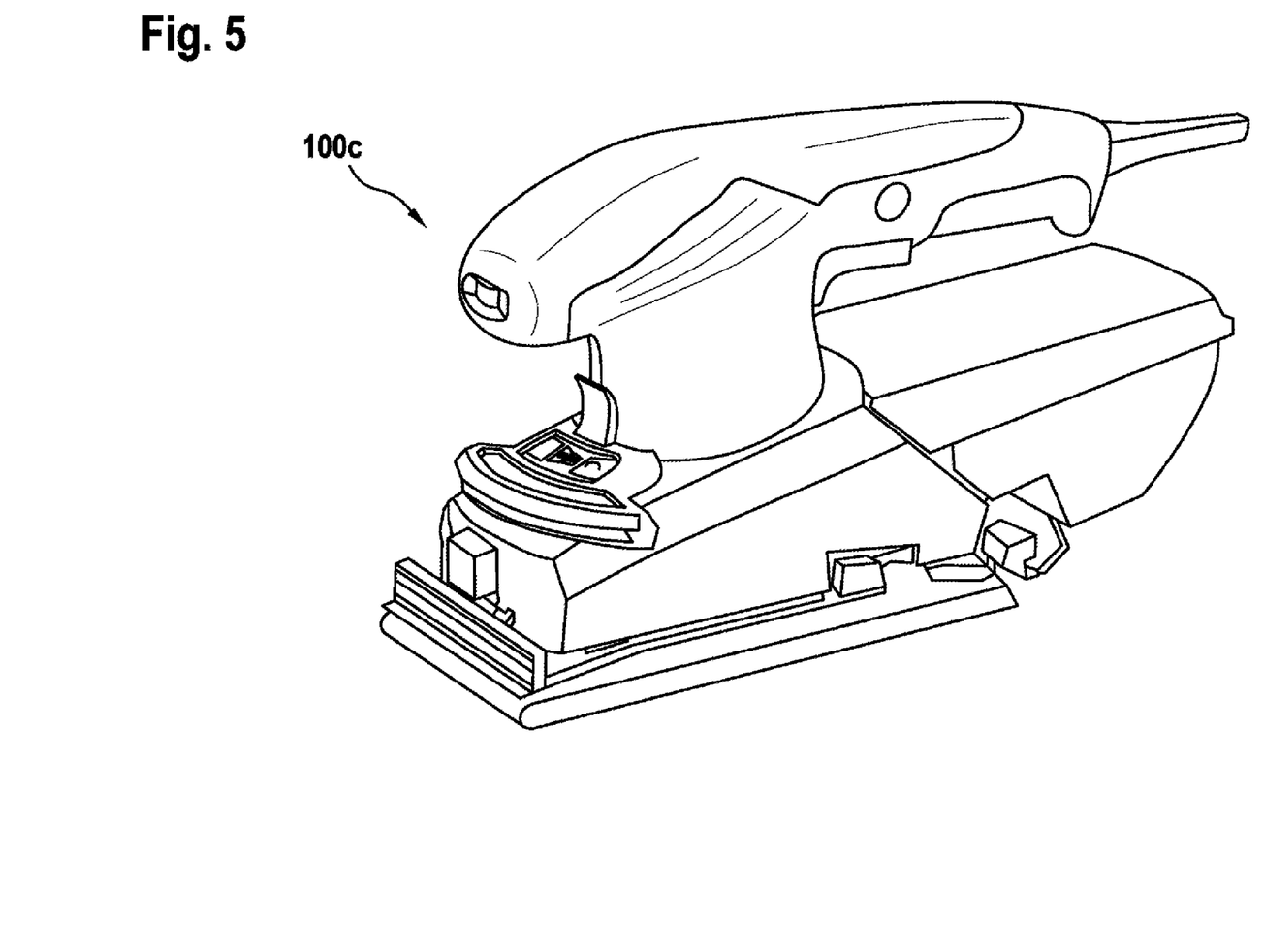

In the exemplary embodiment in FIG. 5, the hand-held power tool 100 is realized as an orbital sander 100c.

Figure 6:
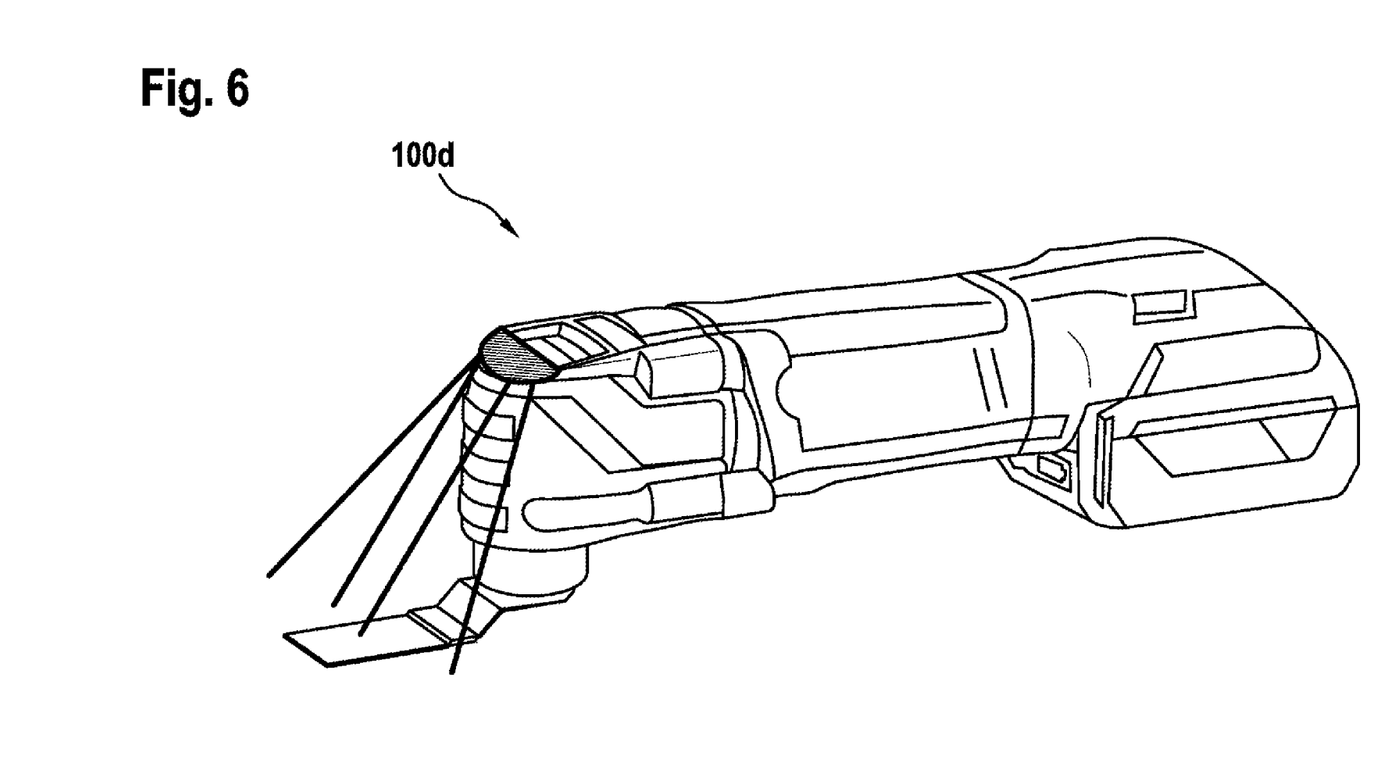
Figure 7:
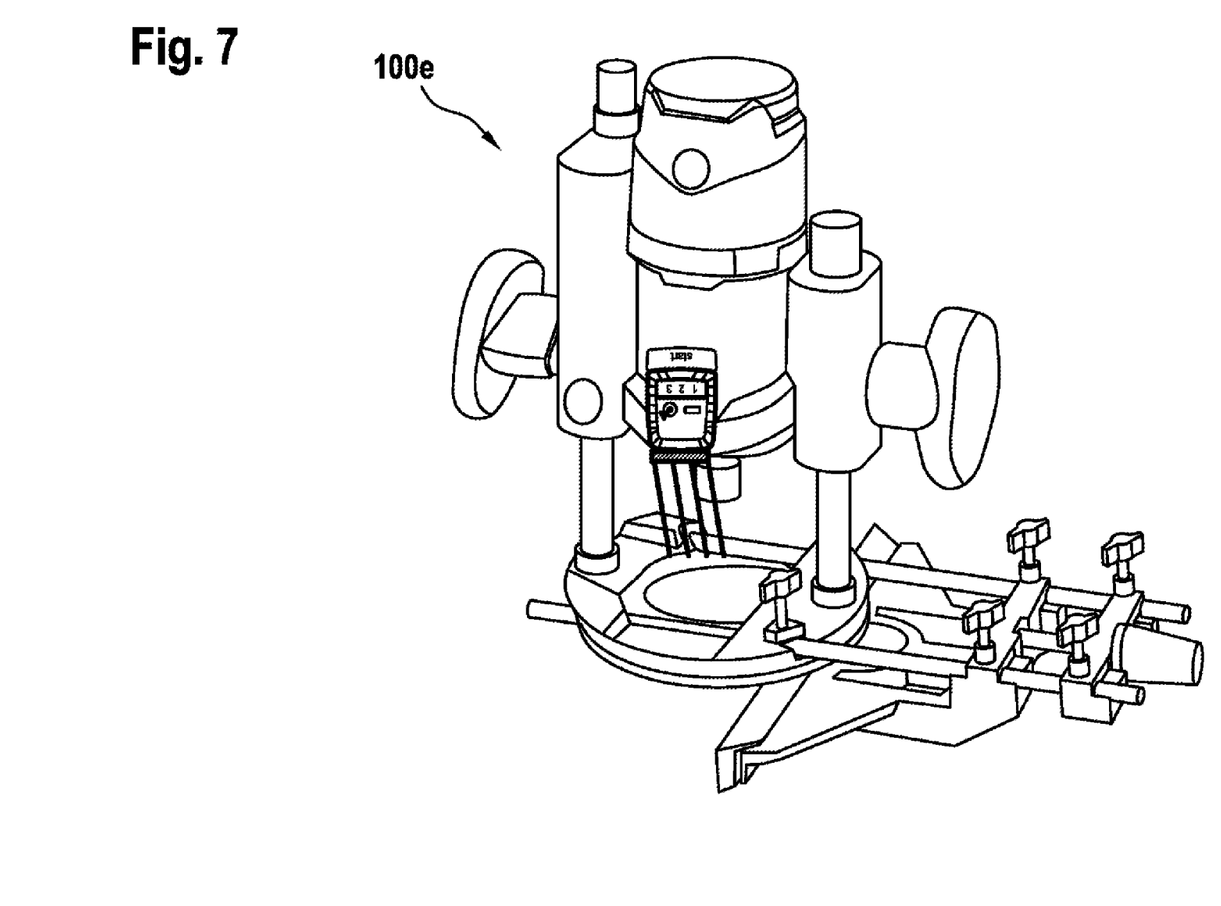

In the exemplary embodiment in FIG. 6, the hand-held power tool 100 is realized as an oscillating multitool 100d.

In the exemplary embodiment in FIG. 5, the hand-held power tool 100 is realized as a router 100e.

It is also conceivable, however, for the hand-held power tool to be realized as a straight grinder, as an electric scraper, as a jigsaw, as a circular saw, as a riveter, as a hammer drill or percussion hammer, as a drill, as a screwdriver or as an impact wrench, or the like.

The invention claimed is:

1. An optical indicating device unit, comprising:
a first housing including:
an illumination device configured to emit visible light; and
an optical device configured to digitally indicate information;
a mechanical interface configured to removably attach the first housing to a power tool housing of a first power tool; and
a data interface configured to receive information to be digitally indicated by the optical device, the information received from an external electronic unit of the first power tool,
wherein, when the at least one first housing is connected to the power tool housing by the mechanical interface, the illumination device is configured to illuminate a work region of the first power tool.

2. The optical indicating device unit as claimed in claim 1, wherein the mechanical interface is configured to removably attach the first housing to the power tool housing of a plurality of different types of power tools.

3. The optical indicating device unit as claimed in claim 1, wherein the illumination device includes at least one of a light source and a light conductor.

4. The optical indicating device unit as claimed in claim 3, wherein the illumination device includes the light conductor, and wherein the light conductor is configured as a bar.

5. The optical indicating device unit as claimed in claim 3, wherein the illumination device includes the light source, and wherein the light source includes at least one LED.

6. The optical indicating device unit as claimed in claim 1, further comprising at least one second electronic unit located within the first housing and configured to perform at least one function.

7. A hand-held power tool, comprising:
a power tool housing;
an external electronic unit configured to provide an optical parameter; and
an optical indicating device unit including:
a first housing having:
an illumination device configured to emit visible light; and
an optical device configured to visually display information;
a mechanical interface configured to removably attach the first housing to the power tool housing; and
a data interface configured to receive the optical parameter from the external electronic unit and to supply the optical parameter to the optical device,
wherein, when the at least one first housing is connected to the power tool housing by the mechanical interface, the illumination device is configured to illuminate a work region of the hand-held power tool.

8. The hand-held power tool as claimed in claim 7, wherein the hand-held power tool is configured as a random-orbit sander, an angle grinder, an orbital or delta sander, an oscillating multitool, or a router.

\* \* \* \* \*